United States Patent [19]

Viannay et al.

[11] 3,927,981
[45] Dec. 23, 1975

[54] MEMBRANE-TYPE BLOOD OXYGENATOR WITH RECYCLE OF OXYGEN-CONTAINING GAS

[75] Inventors: Stéphane Viannay, Plaisir; André Sausse, Sceaux, both of France

[73] Assignee: Rhone Poulenc, Paris, France

[22] Filed: Aug. 30, 1973

[21] Appl. No.: 393,228

[30] Foreign Application Priority Data
Aug. 30, 1972 France.............................. 72.30810

[52] U.S. Cl. ............ 23/258.5; 128/DIG. 3; 195/1.8
[51] Int. Cl.² ......................................... A61M 1/03
[58] Field of Search..................... 23/258.5; 195/1.8; 128/DIG. 3

[56] References Cited
UNITED STATES PATENTS

| | | | |
|---|---|---|---|
| 2,659,368 | 11/1953 | Gibbon et al...................... | 23/258.5 |
| 2,896,620 | 7/1959 | Tremblay............................ | 23/258.5 |
| 3,049,122 | 8/1962 | Everett............................... | 23/258.5 |
| 3,053,254 | 9/1962 | Galajda.............................. | 23/258.5 |
| 3,506,406 | 4/1970 | Birch ................................. | 23/258.5 |
| 3,536,451 | 10/1970 | Ludwin............................... | 23/258.5 |

FOREIGN PATENTS OR APPLICATIONS

| | | | |
|---|---|---|---|
| 1,568,130 | 5/1969 | France............................... | 23/258.5 |
| 1,597,874 | 8/1970 | France............................... | 23/258.5 |

OTHER PUBLICATIONS

T. Kolobow et al.; "High Survival . . . Membrane Blood Oxygenator;" Trans. Amer. Soc. Artif. Int. Organs; Vol. 15; 1969; pp. 172–177.

Primary Examiner—Barry S. Richman
Attorney, Agent, or Firm—Cushman, Darby & Cushman

[57] ABSTRACT

A blood oxygenator in which a blood oxygenator chamber is divided into two compartments by a membrane, blood being fed to and from the first compartment, and oxygenated gas being fed to the second compartments, the oxygen depleted gas leaving the second compartment and a portion of this being recycled back into the second compartment. The recycling is effected by a gas ejector supplied with oxygen containing gas under pressure, the suction connection of which is connected to the outlet of the second compartment and the exhaust connection of which is connected to the inlet of the second compartment via control components, a cartridge for absorbing carbon dioxide, a heat exchanger and a humidifier.

7 Claims, 3 Drawing Figures

MEMBRANE-TYPE BLOOD OXYGENATOR WITH RECYCLE OF OXYGEN-CONTAINING GAS

The present invention relates to an artificial lung of the type including a blood oxygenator containing at least one semi-permeable membrane through which oxygen is transferred to the blood and carbon dioxide from the blood and which can be used for assisting or replacing the pulmonary or cardiopulmonary system of a patient.

The article published in 1969 by KOLOBOW in Trans. Amer. Soc. Artif. Int. Organs., vol. XV, pages 172 to 177, describes an artificial lung comprising a blood oxygenator divided by a membrane into two compartments, blood at a positive relative pressure passing through one and a gas stream containing oxygen at a negative relative pressure passing through the other; the gas stream is introduced into the oxygenator under predetermined conditions of temperature and humidity.

Such an artificial lung can be be equipped with microporous hydrophobic membranes which, due to their high permeability to gases, ensure that bubbles of gas introduced accidentally into the blood are removed. Furthermore, when equipped with non-microporous membranes, for example made of silicone elastomers, micro-perforations can be tolerated therein because these become clogged by the blood (the pressure of which is greater than that of the gases) instead of giving access to gas bubbles.

It is known that it is necessary to flush the oxygenator with a flow of gas containing several times more oxygen than that which would theoretically be sufficient simply to reoxygenate the blood, because the removal of carbon dioxide requires that its partial pressure be considerably lower in the gas phase than in the blood phase. Moreover, the gas must be brought to a suitable temperature and to a suitable moisture content, and this requires the consumption of relatively large amounts of energy.

The aim of the present invention is to make available an economical artificial lung which possesses all the advantages of the artificial lung mentioned and which, moreover, necessitates only a low consumption of gas and only a low consumption of energy.

The present invention provides an artificial lung comprising a blood oxygenator, at least one membrane dividing said blood oxygenator into a first compartment and a second compartment, means for connecting said first compartment into a blood stream, means for supplying a stream of oxygen-containing gas to said second chamber, means for withdrawing gas from said second chamber and means for recycling at least a portion of the gas leaving said second chamber via said withdrawing means.

In a preferred embodiment the lung comprises a blood oxygenator, at least one membrane dividing said blood oxygenator into a first compartment and a second compartment, means for connecting said first compartment into a blood stream, an inlet and an outlet to said second compartment, a source of oxygen-containing gas under pressure and a gas ejector having a pressure nozzle connected to said source of gas and a suction connection connected to the outlet of said second compartment, an exhaust connection of said gas ejector being connected to the inlet of the second compartment, to recycle at least a portion of the gas which leaves the second compartments via said outlet.

In order that the invention will be more fully understood, the following description is given, merely by way of example, reference being made to the accompanying drawings, in which.

Figure 1:
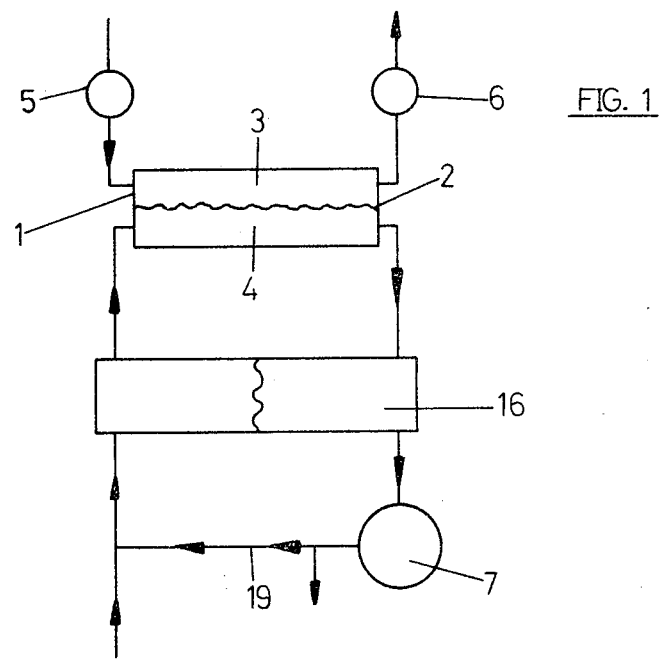
FIG. 1 is a diagram illustrating the principle of an artificial lung according to the invention.

With reference to FIG. 1, the blood oxygenator 1 comprises at least one membrane 2 which is impermeable to blood and to water and is permeable to gases, especially to oxygen, carbon dioxide and water vapour. This membrane separates a first compartment 3 through which the blood passes, from a second compartment 4 through which a gas stream containing oxygen passes.

Veinous blood can be removed from the patient by a pump 5 of the usual type, for example a peristaltic pump or a pump with a tubular membrane and valve, also called a "ventricular pump". The blood is introduced into the compartment 3 from where it can be recovered again by a pump 6, generally of the same type as the pump 5, which sends it back into the arterial network of the patient.

Inside the compartment 3 it is practical to keep the blood at a positive relative pressure (that is to say greater than atmospheric pressure) by any known means. For example, the flow rate of the pump 6 can be controlled as a function of the pressure prevailing in the compartment 3 by altering either the rate of rotation (peristaltic pump) or the frequency of the pulses (ventricular pump) or the ejection volume (in the case of either of the above two types).

A gas stream at a pressure which is everywhere less than that of the blood passes through the compartment 4 of the oxygenator. Since the blood pressure in the compartment 3 is generally greater than atmospheric pressure, it is convenient and preferable from the safety point of view, to keep the gas stream in the oxygenator at a negative relative pressure, that is to say at a pressure less than atmospheric pressure.

To do this, it suffices to supply, at the inlet to the compartment 4, a gas mixture at a pressure less than or substantially equal to atmospheric pressure, and to cause a reduction in pressure at the outlet of this compartment by means of a vacuum pump, or of any other equivalent means such as a gas ejector (filter pump).

Thus, as shown in FIG. 1, a vacuum pump 7 sucks atmospheric air through at least one conditioning device 16 which brings the air to the desired temperature and degree of humidity, and then through the oxygenator 1. From the outlet of the oxygenator, the air passes again through the device 16 which functions as a heat exchanger, and then, at the outlet of the pump 7, it is divided into two portions, one of which is discarded to the atmosphere and the other is conveyed back to the oxygenator via the recycling circuit represented diagrammatically by the line 19.

A gas ejector supplied from a source of air or of oxygen-containing gas, under pressure, is preferably used as the device for sucking the gas present in the oxygenator.

Figure 2:
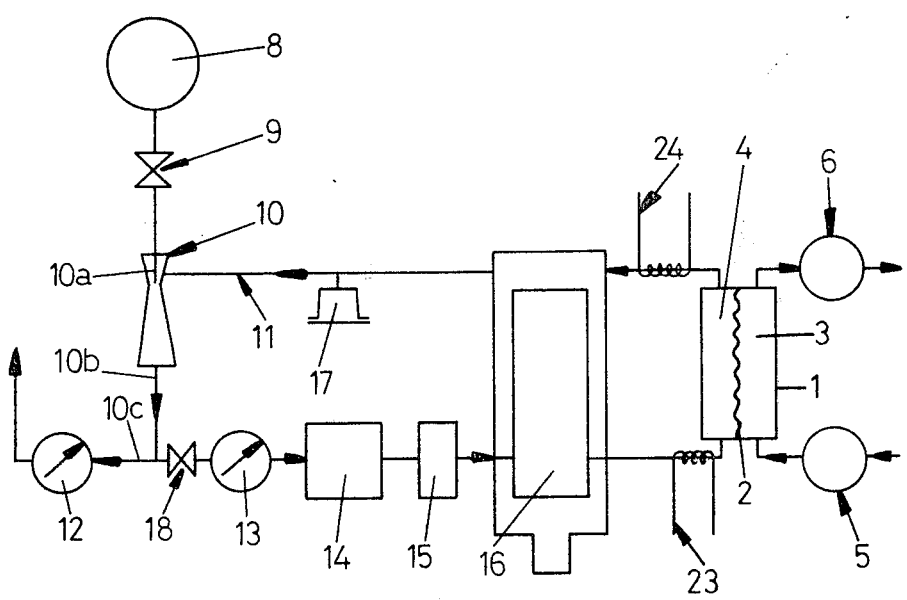
FIG. 2 is a partial diagram of a preferred embodiment of an artificial lung according to the invention.

FIG. 2 represents diagrammatically a preferred embodiment of the invention. The gas circuit comprises a source of oxygen-containing gas, under pressure, for example, a bottle of compressed air or oxygen 8 provided with a pressure reduction valve 9. The pressure reduction valve is connected to the pressure nozzle 10a of a gas ejector 10. The pressure of the drive fluid is reduced to a substantially constant value which is greater than atmospheric pressure, and usually between 1.1 and 6 bars absolute and preferably between 2 and 4 bars absolute. The dilution factor, that is to say the ratio between the total gas flow rate at the exhaust connection 10b of the ejector to the flow rate of the drive fluid is generally chosen between 3 and 10 and preferably between 5 and 7. The gas ejector can be a single-stage ejector or a multi-stage ejector; a single stage is generally quite suitable.

Since the flow rate of the drive gas is generally greater than the overall gas flow rate transferred to the blood, it is necessary to remove the excess gas to the atmosphere through an exhaust outlet 10c and preferably to measure this excess by an auxiliary flow-meter 12 with a very low pressure drop.

Thereafter, the recycling circuit comprises essentially a main flow meter 13 and means 18 for adjusting the flow rate of recycled gas relative to the flow rate of gas which escapes; a purifier 14 (for example, containing soda lime) for fixing the carbon dioxide carried over by the recycling; a mixer 15 for introducing anaesthetic or other fluids; a conditioning device 16 comprising a humidifier and a heat exchanger; an automatic safety valve 17 which opens when the pressure of the gas stream rises to atmospheric pressure and which is located, for example, near the suction connection 11 of the ejector; and connecting tubes joining these various appliances to one another.

A gas/liquid exchanger with a stack of membranes and grooved spacer plates, of the type, for example, described in French Pat. No. 1,597,874, is preferably used as the oxygenator 1.

The oxygenator 1 is equipped with membranes through which gases can permeate, that is to say membranes which are permeable to the respiratory gases and impermeable to liquids in general and to blood in particular. Micro-porous membranes with pores of diameters generally less than 0.3 micron are preferably used as membranes. Advantageously, they are or have been made water-repellant. The membranes described in French Pat. No. 1,568,130 are very suitable.

Peristaltic pumps, which cause only very slight haemolysis, for example, pumps of the types described in French Pat. Nos. 1,529,860 and 69/36805 can be used in the blood circuit. The pipelines through which the blood flows are generally made of silicone elastomers of the types usually employed for extra-corporeal blood circuits, and advantageously coated on the inside with a silicone elastomer which does not contain a filler and is cured to a constant volume.

The flow meters 12 and 13 can be of any known types, such as those with vanes, or those with a float. A valve or a tap of known type, for example a tap with a needle valve, is generally used as the means 18 for adjusting the flow rate of recycled gas relative to the flow rate of gas which escapes. A knowledge of the flow rate of the recycled gas enables an approximate calculation to be made of the degree of dilution of the gas ejector, the flow rates transferred to the blood or removed from the blood being negligible relative to the flow rates in 12 and 13.

A soda lime cartridge 14 fixes the carbon dioxide. The capacity of this cartridge is generally between 0.3 and 3 $dm^3$. Since it is useful to know the quantity of carbon dioxide fixed, it is advantageous to add a saturation indicator, for example a coloured indicator, to the soda lime. The change in the colour of the indicator, corresponding to the gradual saturation of the soda lime with carbon dioxide, can be observed through a transparent wall of the cartridge.

Various devices of known types, such as a sprayer, a mixing nozzle, a bubbler, an evaporator and the like, can be used as the device 15 for introducing a liquid or gas phase into the gas mixture. The conditioning device 16 functions as a heat exchanger through which the gas streams upstream and downstream from the oxygenator pass. The preferred conditioning device comprises a humidifier through which the upstream current passes (towards the oxygenator) and a condenser through which the downstream current passes. Advantageously, the apparatus is insulated in order to eliminate practically all heat losses to the surroundings.

Given that, in the oxygenator, the gas stream tends to become charged with water vapour which originated from the blood and has passed through the membrane, it is necessary, in effect, in order to prevent the patient from suffering from excess losses of water, to humidify the supply gas stream beforehand.

Figure 3:
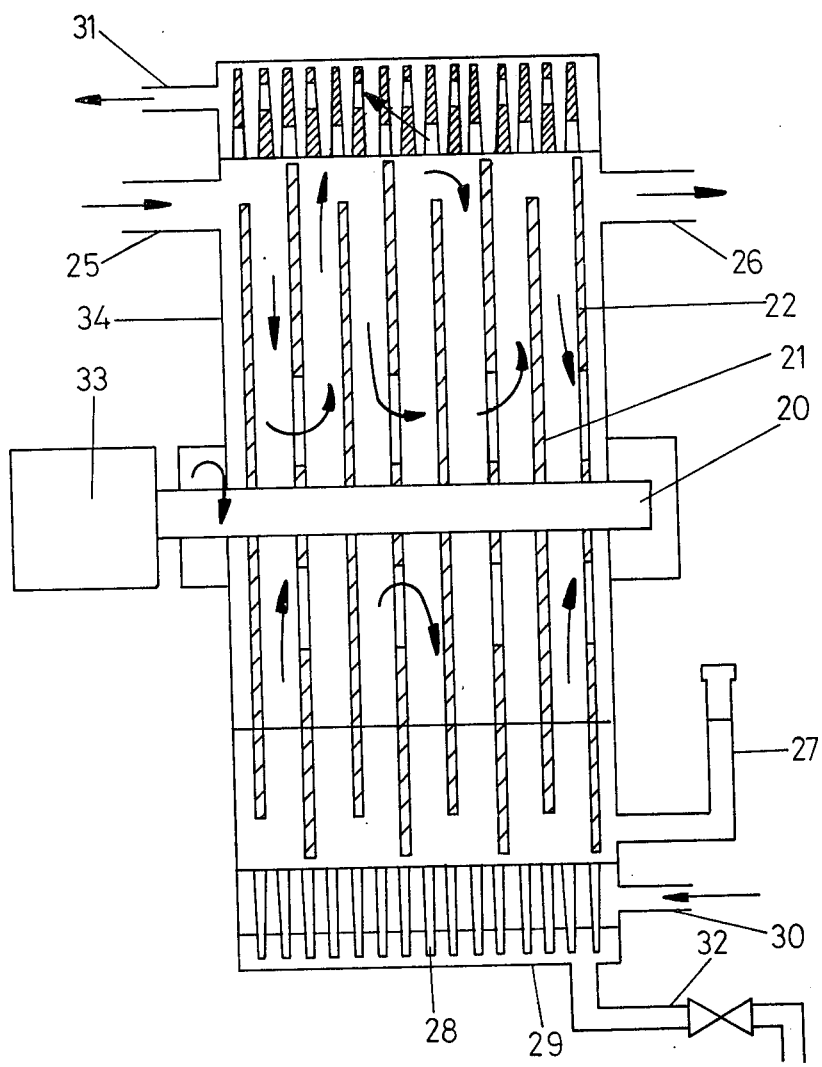
FIG. 3 is an elevation, in cross-section, through a diametral plane, of a device for conditioning the gas stream which is very suitable for the artificial lung according to the invention.

As the humidifier, it is possible to use any suitable device, for example, a device possessing a multiplicity of partially immersed discs, revolving at low speed about a horizontal axle inside a closed vessel, such as that represented in FIG. 3.

This humidifier comprises a horizontal shaft 20 supporting a stack of vertical discs 21 and 22, arranged in the manner of baffle plates and forcing the gas stream to play upon their side surface. This combination is rotated slowly by a motor 33 inside a closed leakproof cylindrical casing 34 equipped with inlet 25 and outlet 26 tubes for the gas stream, as well as with a side tube 27 for filling and controlling the level of liquid inside the casing.

A condenser is defined by the side wall of the casing, which is equipped with vanes with perforations in a staggered arrangement in order to assist heat exchange with the humidifier, and by a peripheral chamber 29. This chamber has an inlet tube 30 and outlet tube 31 for the gas stream coming from the oxygenator, as well as with tube 32 for emptying the condensate.

The condenser makes it possible to recover the latent heat of the vapour coming from the oxygenator and reduces the amount of water which will subsequently be fixed in the purifier 14.

The pipelines connecting the conditioner 16 to the oxygenator 1 are insulated or are preferably equipped with heating means 23 and 24 of any known type in order to prevent any condensation taking place in them, to compensate for the cooling due to the expansion of the drive gas and, where necessary, to raise the temperature of the gas mixture which passes through them by a few degrees. It is possible to use, for example, electrical resistance wires embedded in the wall of tubes made of silicone elastomers.

The humidifier is supplied by a gas stream, the temperature of which is approximately ambient temperature and is generally between 20° and 30°C. This gas stream is saturated with moisture at the temperature reached in the humidifier due to the heat provided by the condenser. The heating device 23 makes it possible for the gas mixture to reach the oxygenator in an unsaturated condition, at a temperature of about 37°C. In the oxygenator, the gas mixture becomes saturated with moisture whilst remaining at a substantially constant temperature. At the outlet of the oxygenator, the heating device 24 prevents any condensation in the pipeline connecting the oxygenator to the condenser. In the condenser, the gas mixture loses its heat and substantially returns to the temperature at which it was at the inlet to the humidifier, that is to say 20° to 30°C.

Instead of discs with staggered perforations, the conditioner can be equipped with helicoidal partitions, the lower part of which has sufficient clearance to enable the liquids present in it to be supplied or emptied.

The characteristics and advantages of the present invention will become more apparent from the following example:

EXAMPLE

A blood oxygenator, consisting of a stack of plane microporous membranes with a useful surface area of 1 $m^2$ and spacers of the type described in French Pat. No. 1,597,874, is used. The blood forms a film of thickness between 0.1 and 0.5 mm in contact with the membrane. It travels, with the help of two peristaltic pumps according to French Pat. No. 69/36805 from the inferior caval vein to the femural artery of a patient. The two pumps, equipped with tubes made of silicone elastomer, revolve at the rate of 35 revolutions/minute and keep the blood inside the oxygenator at an average relative pressure of between 50 and 200 mm of mercury.

Compressed oxygen, the pressure of which is reduced to three bars, is used as the driving gaseous fluid. The oxygen continues to expand through a single-stage ejector of capacitor 1.5 $m^3$/hour. The majority of the oxygen is recycled through a loop circuit as illustrated in FIG. 2. The degree of dilution is between 5 and 7. The flow rate of recycled gas is measured by means of a vane flow meter and the flow rate of gas which escapes is measured by means of a ball flow meter. A valve which opens to the atmosphere for a pressure greater than —3 g/cm² is located in the pipeline for sucking the gas back, near the ejector. It does not have a return spring and must be started by hand at the start of the operation and in case of difficulty.

The recycled gas passes successively through a cartridge of soda lime with a coloured indicator (for example, Methyl Red), a Goldmann anaesthetic sprayer and a conditioning device, before reaching the oxygenator.

The humidifier consists of 13 discs of alternate diameters of 148 and 138 mm, rotating at 5 revolutions/minute, immersed to the extent of 10% in water. The peripheral condenser comprises 13 vanes of diameters 154–198 mm with staggered orifices.

Once permanent working conditions have been established, the blood flows at the rate of 1.0 liter/minute; it enters the oxygenator saturated with oxyhaemoglobin to the extent of 65% and issues therefrom saturated to the extent of 90%, corresponding to an oxygen transfer of 45 millilitres/minute (NTP).

It is also found that the blood enters the oxygenator with a partial pressure of carbon dioxide of 50 mm Hg and issues therefrom with a partial pressure of 40 mm Hg, corresponding to a carbon dioxide transfer of 70 millilitres/minute.

The consumption of drive gas is 120 l/hour (NTP) and the heat energy consumed is 1 kcal/hour. These last figures show how economical is the artificial lung according to the invention.

We claim:
1. A blood oxygenator comprising, in combination:
   a. a blood oxygenator chamber;
   b. at least one gas-permeable membrane dividing said blood oxygenator chamber into a first compartment and a second compartment;
   c. blood inlet and outlet means for connecting said first compartment into a blood stream;
   d. an inlet and outlet means connected to said second compartment;
   e. a source of oxygen-containing gas under pressure;
   f. a gas ejector;
   g. a pressure nozzle of said gas ejector connected to said source of oxygen-containing gas;
   h. means connecting a suction means connection of said gas ejector to said outlet means of said second compartment;
   i. means connecting an exhaust means connection of said gas ejector to said inlet means of said second compartment, effective to recycle a portion of the gas which leaves said second compartment via said outlet means; and
   j. means connecting an exhaust outlet means to said exhaust means connection to release the remainder of the gas flowing out through said exhaust means connection.

2. A blood oxygenator as claimed in claim 1, and further comprising means for maintaining the relative pressures of the blood and the gas in the blood oxygenator respectively positive and negative relative to atmospheric pressure.

3. A blood oxygenator as claimed in claim 1, wherein the membrane of the blood oxygenator is micro-porous and water-repellant.

4. A blood oxygenator as claimed in claim 1 and further comprising a flow meter connected to said exhaust outlet means effective to measure the portion of gas leaving therethrough.

5. A blood oxygenator as claimed in claim 1 and further comprising, connected between said exhaust means connection of said gas ejector and said inlet means of said second compartment, in series a flow meter, means for controlling the distribution of the gas flowing to said inlet means and to said exhaust outlet means, a cartridge means for containing carbon dioxide absorbing material, saturation indicator means for said cartridge means, and a gas humidifying and heat exchange means.

6. A blood oxygenator as claimed in claim 5, and further comprising means connecting a safety valve means between said outlet means of said second compartment and said suction means connection of said gas ejector and heating means for heating the means connecting said outlet means of said second compartment to said suction connection means of said gas ejector.

7. A blood oxygenator as claimed in claim 5, wherein said gas humidifying and heat exchange means comprises a vessel, means for feeding said oxygen-containing gas stream to and from said vessel, a plurality of spaced apart substantially vertical discs within said vessel, and means to rotate said discs about a substantially horizontal axis, and means to feed aqueous liquid to the bottom of said vessel whereby said discs are partially immersed in said aqueous liquid, whereby said oxygen-containing gas stream is humidified and the temperature thereof is regulated.

* * * * *